United States Patent [19]
Steffens, Jr.

[11] Patent Number: 6,007,100
[45] Date of Patent: *Dec. 28, 1999

[54] APPARATUS FOR PROTECTING A VEHICLE OCCUPANT'S HEAD FROM AN IMPACT

[75] Inventor: Charles E. Steffens, Jr., Washington, Mich.

[73] Assignee: TRW Vehicle Safety Systems Inc., Lyndhurst, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/788,394

[22] Filed: Jan. 27, 1997

[51] Int. Cl.⁶ .................................................. B60R 22/18
[52] U.S. Cl. ...................... 280/801.1; 280/751; 280/808
[58] Field of Search ................................ 280/801.1, 808, 280/805, 751; 297/464, 468, 482, 483; 267/286, 289, 272, 167, 169, 166

[56] References Cited

U.S. PATENT DOCUMENTS

| | | | |
|---|---|---|---|
| 5,529,344 | 6/1996 | Yasui et al. | 280/808 |
| 5,685,566 | 11/1997 | Hirase et al. | 280/808 |
| 5,779,270 | 7/1998 | Tanaka | 280/808 |
| 5,820,164 | 10/1998 | Patel et al. | . |
| 5,826,907 | 10/1998 | Saito et al. | . |
| 5,863,069 | 1/1999 | Wickenheiser et al. | 280/751 |

FOREIGN PATENT DOCUMENTS

| | | |
|---|---|---|
| 29519483 | 5/1996 | Germany . |
| 07329708 | 12/1995 | Japan . |
| 2147795 | 5/1985 | United Kingdom ................ 280/801.1 |

*Primary Examiner*—Eric Culbreth
*Attorney, Agent, or Firm*—Tarolli, Sundheim, Covell, Tummino & Szabo L.L.P.

[57] ABSTRACT

An apparatus (10) for helping to protect a vehicle occupant's head (140) from an impact in a passenger compartment (13) of a vehicle includes a webbing guide (30) for guiding movement of seat belt webbing (14) in the vehicle. A mounting bolt (70) has a bolt head (76) for attaching the webbing guide (30) to the vehicle. A spring member (100/200) is held in position between the bolt head (76) and a portion (32) of the webbing guide (30). The spring member (100/200) extends into the passenger compartment (13) beyond the bolt head (76) and is compressible in response to application of a force due to occupant movement in the passenger compartment.

16 Claims, 7 Drawing Sheets

Fig.14

APPARATUS FOR PROTECTING A VEHICLE OCCUPANT'S HEAD FROM AN IMPACT

BACKGROUND OF THE INVENTION

1. Technical Field

The present invention relates to a vehicle seat belt system, and particularly relates to an apparatus for helping to protect a vehicle occupant's head from a forcible impact against a seat belt webbing guide which is mounted in a passenger compartment of the vehicle.

2. Description of the Prior Art

A typical vehicle seat belt system includes a length of belt webbing which is extensible about a vehicle occupant to restrain the occupant of a vehicle seat. Intermediate its ends, the belt webbing passes through a webbing guide, sometimes referred to as a D-ring, which is mounted in the vehicle adjacent the vehicle seat. In the event of a collision, particularly a side impact collision, the head of the occupant can forcibly impact the webbing guide.

SUMMARY OF THE INVENTION

The present invention is an apparatus for helping to protect a vehicle occupant's head from a forcible impact in a passenger compartment of a vehicle. The apparatus comprises a webbing guide for guiding movement of seat belt webbing in the vehicle and a mounting bolt having a bolt head for mounting the webbing guide in position in the vehicle. A spring member is held in position between the bolt head and a portion of the webbing guide. The spring member extends into the passenger compartment beyond the bolt head and is compressible in response to application of a force due to occupant movement in the passenger compartment.

A resilient cover member is secured to the webbing guide. The cover member covers the mounting bolt and defines a space between the mounting bolt and the cover member where the spring member is located.

In accordance with one embodiment of the invention, the spring member has a series of axially spaced coils including a mounting coil at a terminal end of the spring member. The mounting coil defines a mounting opening for receiving the mounting bolt. Each coil in the series of coils except the mounting coil has an undulating configuration and alternating undulations on adjacent coils oppose each other to provide stiffness for the spring member.

In accordance with another embodiment of the invention, a disk-shaped spring member is provided which has a main portion and a plurality of arms extending radially outward from the main portion. The main portion includes a central opening for receiving the mounting bolt. Each one of the plurality of arms includes a base portion which is planar and an associated web portion which is bowed. Each web portion connects its associated base portion with the main portion of the spring member.

According to yet another embodiment of the invention, the mounting coil of the spring member is attached to the cover member. In still another embodiment, the mounting coil of spring member is attached to the webbing guide.

BRIEF DESCRIPTION OF THE DRAWINGS

Further features of the present invention will become apparent to one skilled in the art to which the present invention relates from reading the following specification with reference to the accompanying drawings, in which.

DESCRIPTION OF PREFERRED EMBODIMENTS

Figure 1:
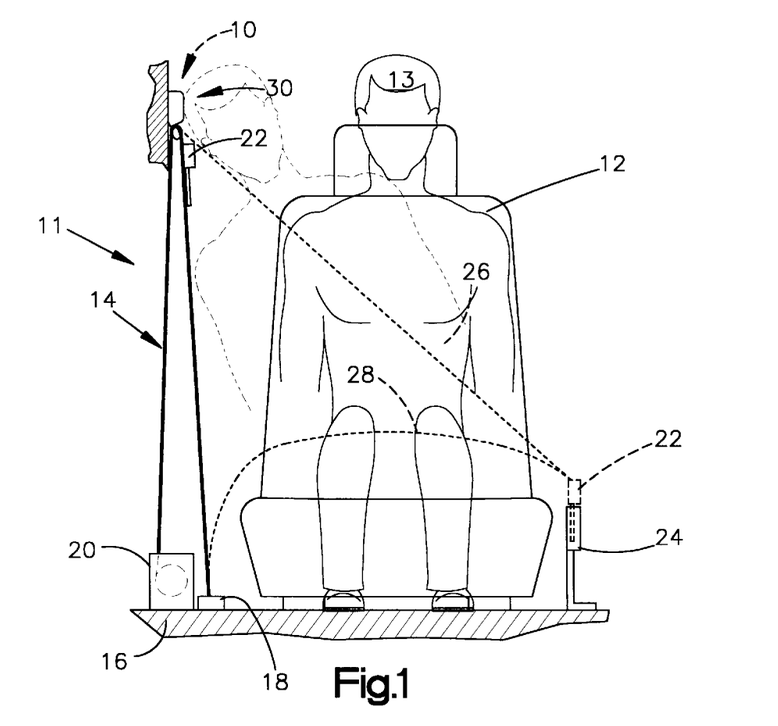
FIG. 1 is a schematic illustration of a vehicle seat belt system including an apparatus constructed in accordance with the present invention.

The present invention relates to a vehicle seat belt system, and particularly relates to an apparatus for helping to protect a vehicle occupant's head from a forcible impact against a seat belt webbing guide which is mounted in a passenger compartment of the vehicle. The present invention is applicable to various seat belt system configurations. As representative of the present invention, FIG. 1 illustrates an apparatus 10 for helping to protect a vehicle occupant's head from a forcible impact. The apparatus 10 is incorporated in a three-point continuous loop seat belt system 11 for use in restraining the occupant in the vehicle.

During operation of the vehicle, the occupant of the vehicle sits on a seat 12 in a passenger compartment 13 of the vehicle. A length of seat belt webbing 14 is extensible about the vehicle occupant. One end of the length of belt webbing 14 is anchored to the vehicle body 16 at an anchor point 18 located on one side of the seat 12. The opposite end of the belt webbing 14 is attached to a seat belt webbing retractor 20 which is secured to the vehicle body 16 on the same side of the seat 12. Intermediate its ends, the belt webbing 14 passes through a tongue assembly 22 and a webbing guide 30 that is located above the retractor 20 and the anchor point 18. When the seat belt system 11 is not in use, the belt webbing 14 is wound on the retractor 20 and is oriented generally vertically on the one side of the seat 12, as shown in solid lines in FIG. 1.

To engage the seat belt system 11, the tongue assembly 22 is manually grasped and is pulled across the lap and torso of the occupant sitting in the seat 12. As the tongue assembly 22 is pulled across the lap and torso of the occupant, the tongue assembly 22 moves along the belt webbing 14, and the belt webbing 14 is unwound from the retractor 20. When the belt webbing 14 has been pulled across the lap and torso of the occupant, the tongue assembly 22 is connected with a buckle 24, as shown in dashed lines in FIG. 1. The buckle 24 is connected to the vehicle body 16 and is disposed on the side of the seat 12 opposite the anchor point 18. When the seat belt system 11 is thus buckled, the length of belt webbing 14 is divided by the tongue assembly 22 into a torso portion 26 which extends across the torso of the occupant and a lap portion 28 which extends across the lap of the occupant.

Figure 2:
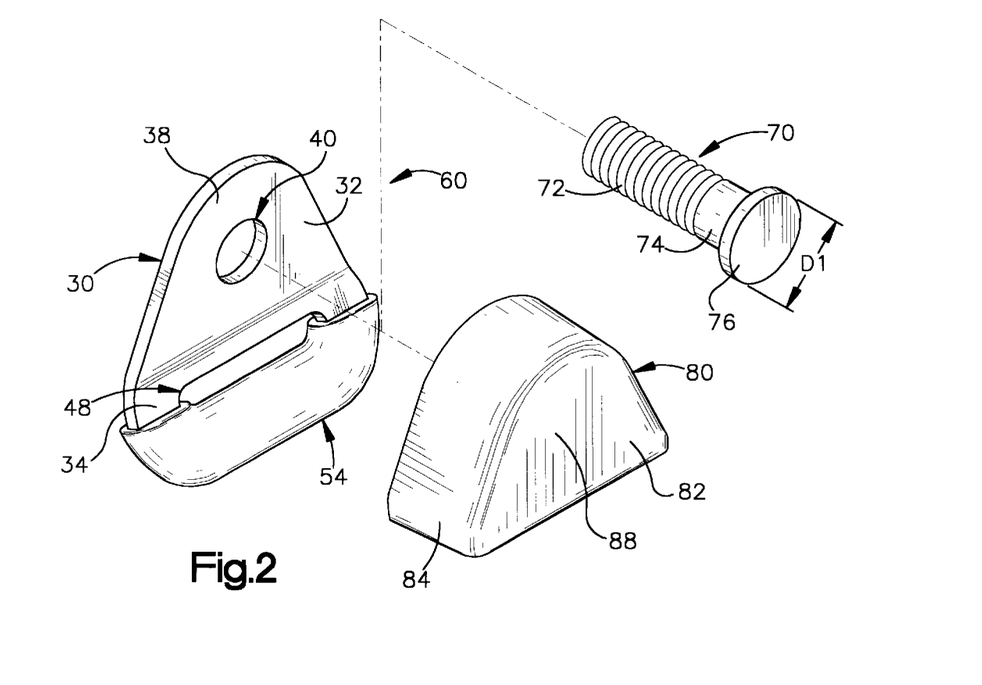
FIG. 2 is an exploded perspective view of parts of the vehicle seat belt system shown in FIG. 1.

The webbing guide 30 (FIG. 2) is preferably made from metal and is substantially triangular in shape. The webbing guide 30 shown is one of the many different types of webbing guides which are known in the art. The webbing guide 30 includes a planar body section 32 and a guide section 34 which extends from the body section 32 at an angle Φ (FIG. 3) relative to the body section. The body section 32 has parallel first and second side surfaces 36 and 38. A clearance hole 40 is located in the center of the body section 32 of the webbing guide 30 as shown in FIG. 2.

The guide section 34 of the webbing guide 30 has parallel first and second side surfaces 42 and 44 (FIG. 3) which merge with the first and second side surfaces 36 and 38, respectively of the body section 32. The guide section 34 has a lower edge surface 46 which comprises the base of the triangular-shaped webbing guide 30. An elongate slot 48 (FIG. 2) extends through the guide section 34. The elongate slot 48 is defined by an upper surface 50 and a lower surface 52.

Figure 3:
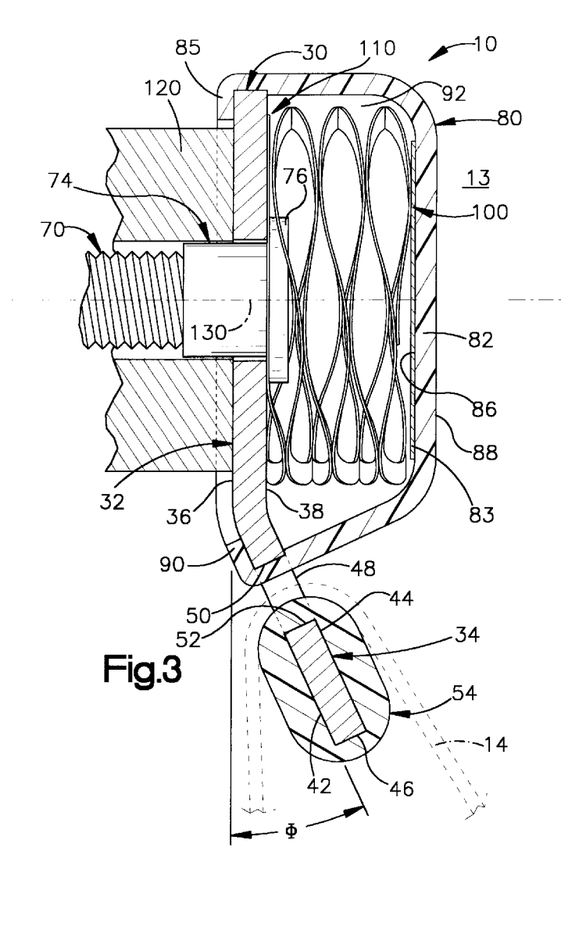
FIG. 3 is a sectional view of a portion of the apparatus shown in FIG. 1.

The webbing guide 30 further includes a webbing engagement cap 54. The webbing engagement cap 54 is preferably made from a plastic material with a low coefficient of friction and is bonded to the guide section 34 of the webbing guide 30 in a manner known in the art, such as by insert molding. The webbing engagement cap 54 covers portions of both the first and second surfaces 42 and 44 of the guide section 34, the lower surface 52 of the elongated slot 48, and the lower edge surface 46 of the guide section 34. As best seen in FIG. 3, the webbing engagement cap 54 is rounded on all sides.

A mounting bolt 70 for mounting the webbing guide 30 has a threaded portion 72, a shank portion 74, and a head 76. The dimensions of the threaded and shank portions 72 and 74, respectively, are selected so that the threaded and shank portions extend freely through the clearance hole 40 in the body section 32 of the webbing guide 30. The head 76 of the mounting bolt 70 has a diameter D1 (FIG. 2) which is greater than the diameter of the clearance hole 40 in the webbing guide 30.

The apparatus 10 further preferably includes a known resilient cover member 80. The cover member 80 (FIG. 2) is substantially triangular in shape and approximately the same size as the body section 32 of the webbing guide 30. The cover member 80 is preferably made from plastic material. The cover member 80 includes a face portion 82, a peripheral side wall portion 84, and a peripheral lip 85 (FIG. 3). The face portion 82 has an inner surface 86 and an outer surface 88 which faces the passenger compartment 13. An optional load distribution member 83 may be placed adjacent to the surface 88 to stiffen the face portion 82.

The peripheral lip 85 of the cover member 80 extends from the peripheral side wall portion 84 over the peripheral edges of the webbing guide 30 and engages the first surfaces 36 and 42 of the body section 32 and the guide section 34, respectively, of the webbing guide 30. A portion 90 of the peripheral lip 85 extends through the slot 48 in the guide section 34 to engage the first surface 42 in the guide section 34.

The cover member 80 has a snap fit on the webbing guide 30. When the cover member 80 is snapped in place on the webbing guide 30, a space 92 is defined between the inner surface 86 of the face portion 82 of the cover member 80 and the mounting bolt 70.

As an alternative to the cover member 80 described above, the cover member may be formed by a vehicle trim piece which extends from a portion of the vehicle, such as the B-pillar.

A spring member 100 is located in the space 92 between the inner surface 86 of the cover member 80 and the mounting bolt 70. The spring member 100 biases the face portion 82 of the cover member 80 away from the mounting bolt 70. The spring member 100 is preferably made from metal, such as carbon steel. The spring member 100 comprises a series of axially spaced coils 102 (FIG. 5) including a mounting coil 110 at a terminal end 112 of the spring member. The mounting coil 110 is generally planar and has an inside diameter D2 which defines a mounting opening 114 (FIGS. 5 and 6) in the spring member. The diameter D2 of the mounting opening 114 is smaller than the diameter D1 of the head 76 of the mounting bolt 70.

Figure 5:
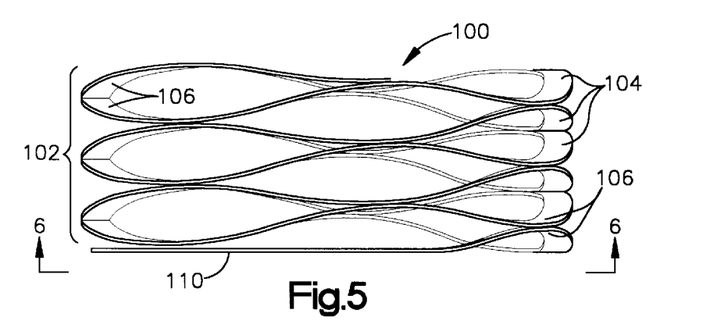
FIG. 5 is a side view of a part of the apparatus shown in FIG. 3.
Figure 6:
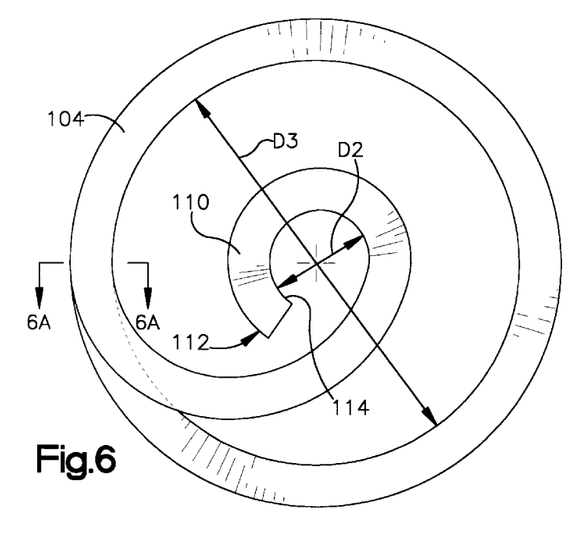
FIG. 6 is a view taken along line 6—6 in FIG. 5.

Each one of the coils 104 in the series of coils 102, with the exception of the mounting coil 110, has the same inside diameter D3. The diameter D3 is significantly larger than the diameter D1 of the bolt head 76.

Figure 6A:
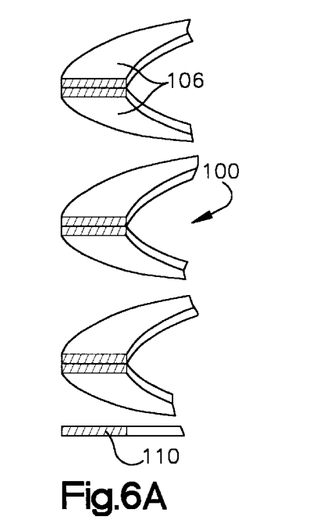
FIG. 6A is sectional view taken along line 6A—6A in FIG. 6.
Figure 6B:
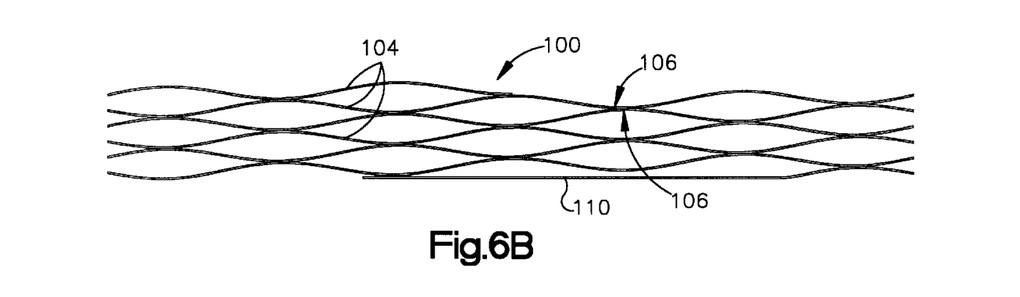
FIG. 6B is a schematic side view of FIG. 6 shown rolled out.

The coils 104 in the spring member 100 have an undulating configuration as illustrated in FIGS. 5, 6A and 6B. Adjacent coils 104 of the spring member 100 have alternating undulations 106 which oppose and contact each other to provide the stiffness for the spring member 100. The spring member 100 has a spring rate in the range of 200–500 lbs./inch. and preferably has a spring rate of approximately 200–300 lbs./inch.

FIG. 3 illustrates the attachment of the spring member 100 in the apparatus 10. The shank portion 74 of the mounting bolt 70 extends through the mounting opening 114 in the mounting coil 110 of the spring member 100. The mounting coil 110 is axially held in position between the second side surface 38 of the body section 32 of the webbing guide 30 and the underside of the bolt head 76. The majority of the coils 104 of the spring member 100 extend into the space 92 beyond the bolt head 76 of the mounting bolt 70. When the mounting bolt 70 is secured to a portion 120 of the vehicle, the webbing guide 30, the cover member 80, and the spring member 100 are free to rotate about a mounting axis 130 while maintaining the spring member 100 in an axially secured position.

In the event of a vehicle collision, especially a side impact collision, the occupant of the seat 12 typically moves in the passenger compartment 13. The movement of the occupant can result in a portion 140 (FIG. 4) of the occupant, such as the occupant's head, striking the cover member 80. When the cover member 80 is struck, the cover member 80 deflects inward and transfers the force of the impact to the spring member 100. The force of the impact causes the cover member 80 and the spring member 100 to deform from their original condition shown in FIG. 3 to a compressed condition shown in FIG. 4.

Figure 4:
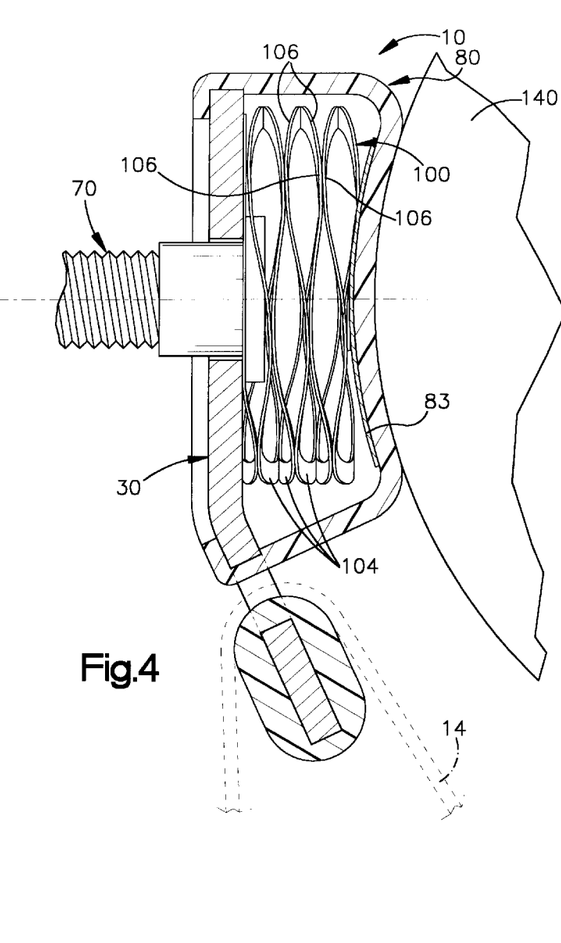
FIG. 4 is view similar to FIG. 3 showing parts in different positions.

When the spring member 100 is compressed, the alternating undulations 106 on adjacent coils 104 are pressed against one another, thereby urging the undulations in the coils 104 to flatten to an extent. The coils 104 resist this flattening according to the predetermined spring rate of the spring member 100.

The resistance to compression provided by the spring member 100 in the apparatus 10 protects the occupant's head 140 from the full force of the impact by reducing the peak acceleration seen by the occupant's head. Further, because the majority of the coils 104 of the spring member 100 extend into the passenger compartment 13 beyond the mounting bolt 70, the apparatus 10 reduces the chance that the cover member 80, which is engaged by the occupant's head 140, will directly contact the mounting bolt 70.

When the occupant's head moves out of contact with the cover member 80 and thus the force is removed, the cover member 80 and the spring member 100 return to approximately their respective original conditions shown in FIG. 3.

Figure 7:
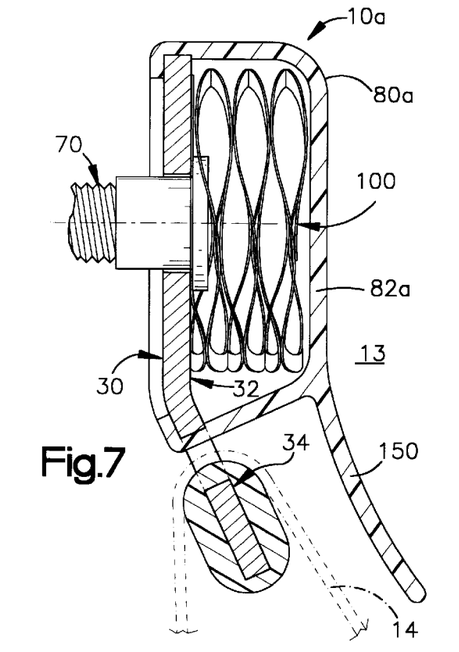
FIG. 7 is a sectional view showing a second embodiment of the present invention.
Figure 8:
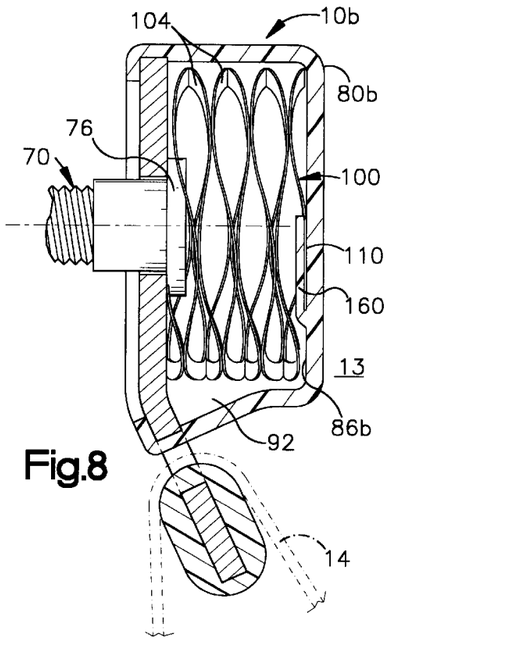
FIG. 8 is a sectional view showing a third embodiment of the present invention.
Figure 9:
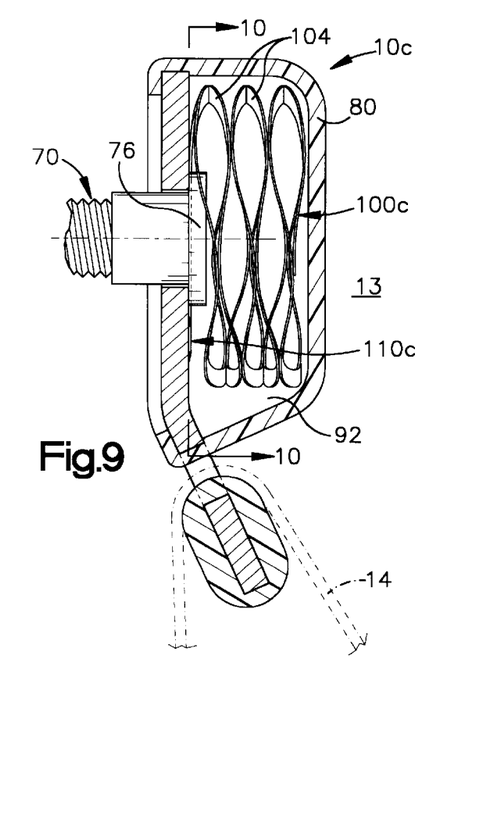
FIG. 9 is a sectional view showing a fourth embodiment of the present invention.

Alternate embodiments of the present invention are shown in FIGS. 7–9. In these alternate embodiments, reference numbers similar to those of the embodiment of FIG. 3 are used to designate parts similar to the parts of FIG. 3. In the second embodiment, shown in FIG. 7, the apparatus 10a includes a resilient cover member 80a. The cover member 80a has an extension 150 which is formed as one piece with and which extends downward from the face portion 82a. The extension 150 may be planar or slightly curved as illustrated in FIG. 7. The extension 150 may also include a side wall portion (not shown) which extends toward the guide section 34 of the webbing guide 30. The extension 150 of the cover member 80a at least partially covers the guide section 34 of the webbing guide 30 to help prevent a portion of the vehicle occupant, such as the head, from directly contacting the guide section in the event of a collision. The extension 150 also enlarges the surface area of the cover member 80a to help reduce the contact stress to the head of the vehicle occupant.

In the third embodiment, shown in FIG. 8, the apparatus 10b includes a resilient cover member 80b. The face portion of the cover member 80b is thicker and includes a narrow pocket 160 on the inner surface 86b. The dimensions of the pocket 160 are selected so that the mounting coil 110 of the spring member 100 fits tightly inside the pocket 160 to secure the spring member 100 to the cover member 80b. The spring member 100 is turned 180° from its orientation in FIG. 3. In this embodiment, the coils 104 adjacent the webbing guide 30 are disposed radially outward of and extend circumferentially about the mounting bolt 70. The majority of the coils 104 in the spring member 100 extend beyond the head 76 of the mounting bolt 70 in the direction of the passenger compartment 13.

Figure 9A:
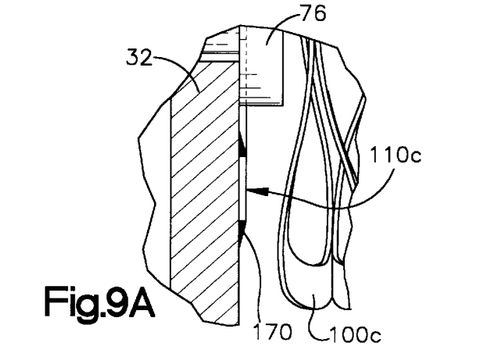
FIG. 9A is enlarged view of a portion of FIG. 9.
Figure 10:
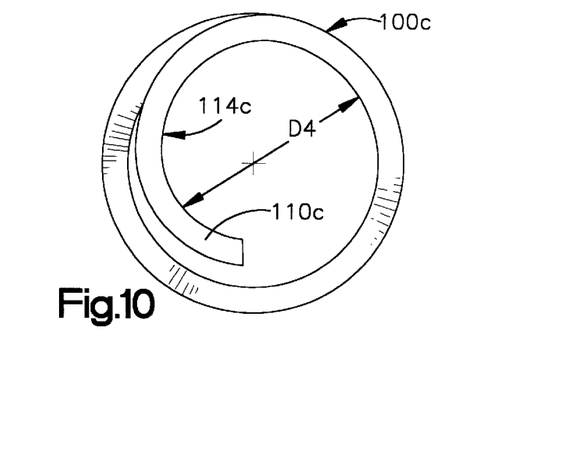
FIG. 10 is a view taken along line 10—10 in FIG. 9 with parts omitted for clarity.

In the fourth embodiment, shown in FIG. 9, the apparatus 10c includes a spring member 100c having a mounting coil 110c which defines a larger diameter D4 for the mounting opening 114c (FIG. 10). The diameter D4 is larger than the diameter D1 of the bolt head 76. The mounting coil 110c of the spring member 10c is attached directly to the body section 32 of the webbing guide 30 by a suitable means, such as a weld 170 shown in FIG. 9A or a snap-on style interference fit. The coils 104 adjacent the webbing guide 30 are disposed radially outward of and extend circumferentially about the mounting bolt 70. The majority of the coils 104 in the spring member 100 extend beyond the head 76 of the mounting bolt 70 in the direction of the passenger compartment 13.

Figure 11:
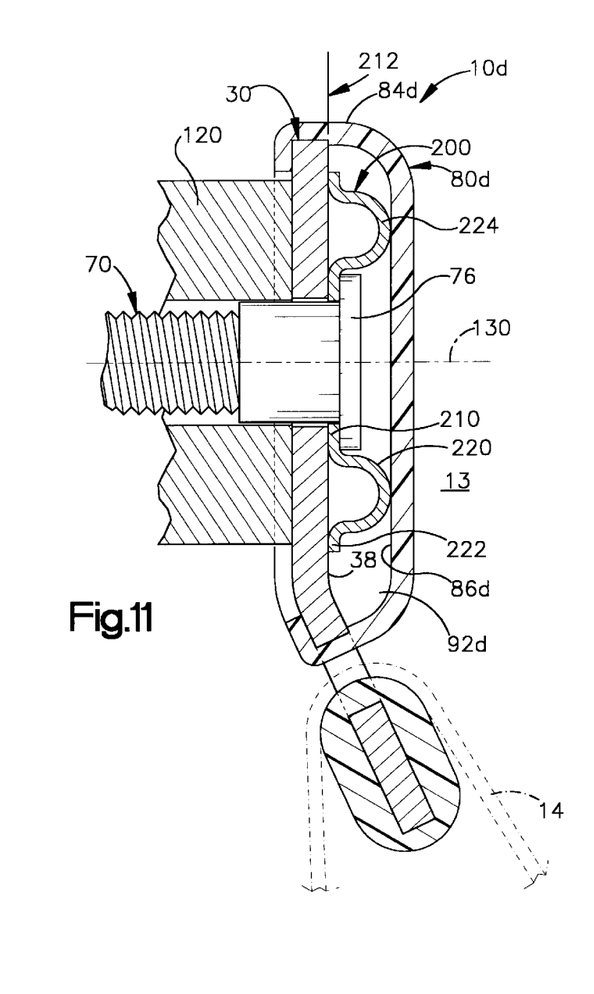
FIG. 11 is a sectional view showing a fifth embodiment of the present invention.

FIGS. 11–14 illustrate an apparatus 10d in accordance with a fifth embodiment of the present invention. The apparatus 10d includes a disk-shaped spring member 200, in place of the coil spring member 100. The disk-shaped spring member 200 is preferably made from a metal and includes a main portion 210 and a plurality of arms 220 which extend radially outward from the main portion. Although the spring member 200 is shown with four arms 220, the spring member could have more or less than four arms. The main portion 210 lies in a mount plane 212 (FIG. 11). A central opening 214 is located in the main portion 210 of the spring member 200. Each arm 220 has a planar base portion 222 which lies in the mount plane 212 and a web portion 224 which extends away from the base portion 222. The web portions 224 are bowed, as may be seen in FIG. 13, and connect the base portions 222 of the arms 220 with the main portion 210 of the spring member 200.

The side wall portion 84d of the cover member 80d, in the apparatus 10d, may not extend as far into the passenger compartment 13 as the side wall portions of the cover members in the previous embodiments. As a result, the space 92d defined between the inner surface 86d of the cover member 80d and the mounting bolt 70 may be smaller than the space 92 in the previous embodiments. The spring rate of the spring member 200 which is in the range of 200–500 lbs./inch. is preferably approximately 300–500 lbs./inch.

FIG. 11 illustrates the attachment of the spring member 200 in the apparatus 10d. The mounting bolt 70 is received through the central opening 214 in the main portion 210 of the spring member 200. The main portion 210 of the spring member 200 is axially held in position between the second side surface 38 of the body section 32 of the webbing guide 30 and the underside of the bolt head 76. The web portion 224 of each arm 220 of the spring member 200 extends into the space 92 beyond the bolt head 76 of the mounting bolt 70. When the mounting bolt 70 is secured to the portion 120 of the vehicle, the webbing guide 30, the cover member 80d, and the spring member 200 are free to rotate about the mounting axis 130 while maintaining the spring member 200 in an axially secured position.

In the event of a vehicle collision, especially a side impact collision, the movement of the occupant can result in the head 140 of the occupant striking the cover member 80d. When the cover member 80d is struck, the cover member 80d deflects inward and transfers the force of the impact to one or more of the arms 220 of the spring member 200. The force of the impact causes the cover member 80d and the spring member 200 to deform from their original condition shown in FIG. 11 to a compressed condition shown in FIG. 12.

Figure 12:
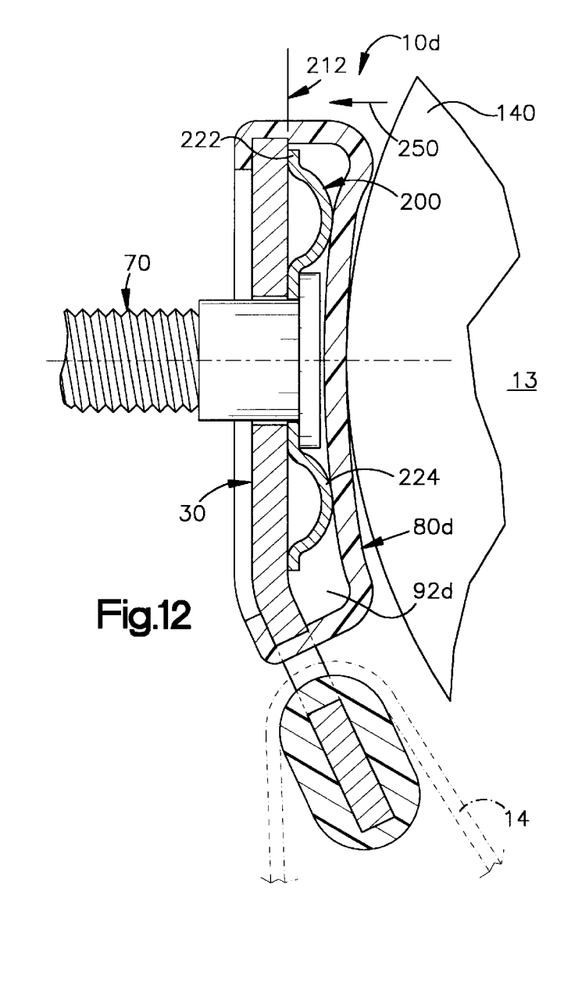
FIG. 12 is a view similar to FIG. 11 showing parts in different positions.
Figure 13:
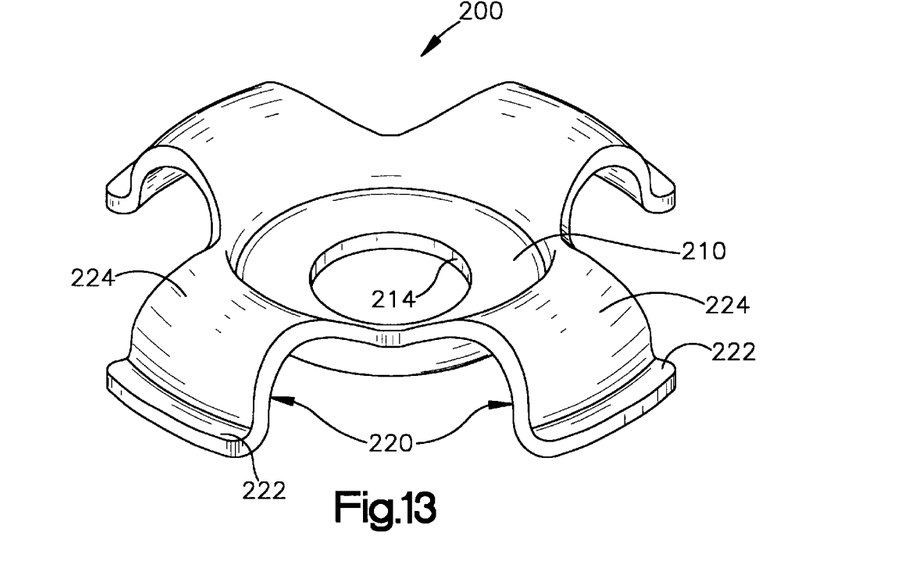
FIG. 13 is a perspective view of a part of the apparatus shown in FIG. 11.
Figure 14:
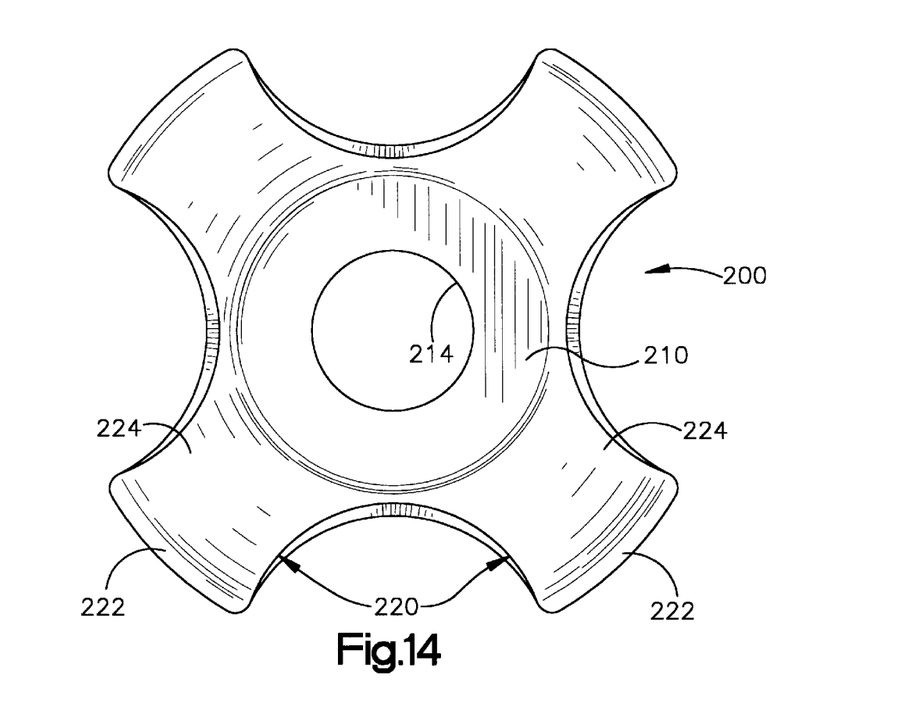
FIG. 14 is an elevational view of the part of the apparatus shown in FIG. 13.

When the arms 220 of the spring member 200 are compressed by force applied to the cover member 80d, the web portion 224 of each arm 220 moves toward the mount plane 212 in a direction 250 which is substantially perpendicular to the mount plane 212. This movement causes each corresponding base portion 222 to move radially outward along the mount plane 212, that is, in a direction away from the main portion 210 of the spring member 200. The arms 220 resist this movement according to the predetermined spring rate of the spring member 200.

The resistance to compression provided by the spring member 200 in the apparatus 10*d* helps to protect the occupant's head 140 from the full force of the impact by reducing the peak acceleration seen by the occupant's head. Further, because the web portion 224 of each arm 220 of the spring member 200 extends into the passenger compartment 13 beyond the mounting bolt 70, the apparatus 10*d* helps to reduce the chance that the cover member 80*d*, when engaged by the occupant's head, will directly contact the mounting bolt 70.

When the occupant's head 140 moves out of contact with the cover member 80*d*, the cover member 80*d* and the spring member 200 return to approximately their respective original conditions shown in FIG. 11.

Figure 15:
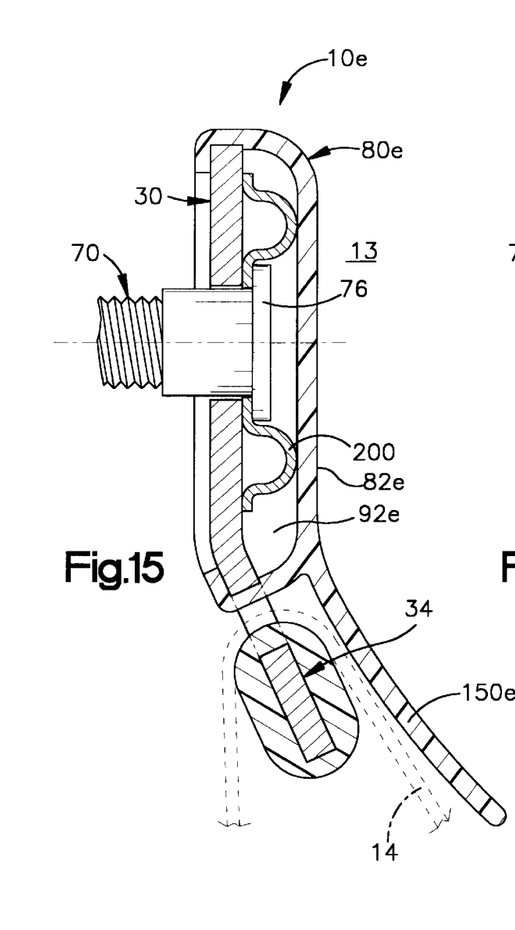
FIG. 15 is a sectional view showing a sixth embodiment of the present invention.
Figure 16:
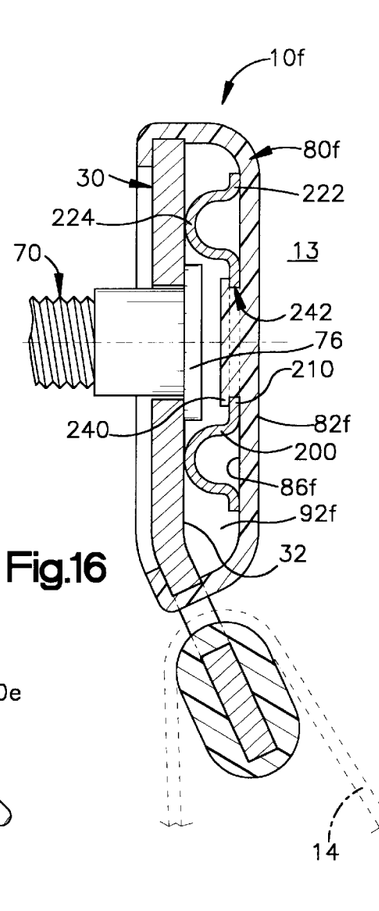
FIG. 16 is a sectional view showing a seventh embodiment of the present invention.
Figure 17:
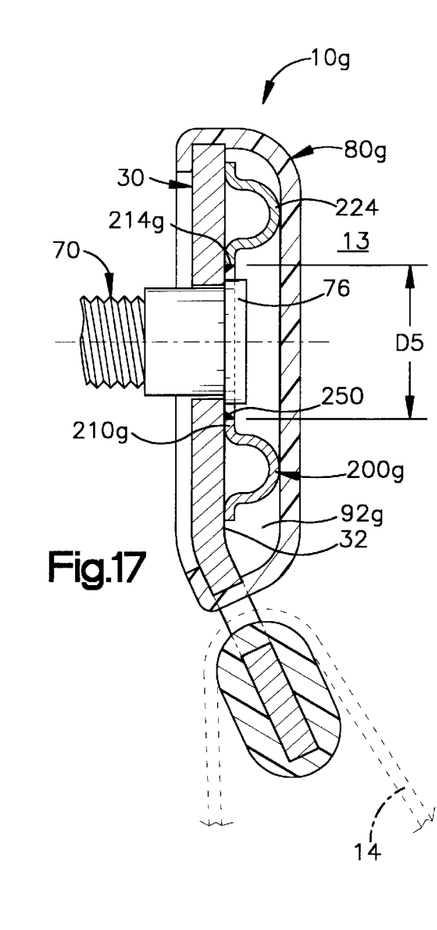
FIG. 17 is a sectional view showing a eighth embodiment of the present invention.

Alternate embodiments of the present invention which utilize the spring member 200 are shown in FIGS. 15–17. In these alternate embodiments, reference numbers similar to those of the previous embodiments are used to designate parts similar to the parts of the previous embodiments. In the sixth embodiment, shown in FIG. 15, the apparatus 10*e* includes a resilient cover member 80*e*. The cover member 80*e* has an extension 150*e* which is formed as one piece with and which extends downward from the face portion 82*e*. The extension 150*e* may be planar or slightly curved as illustrated in FIG. 15. The extension 150*e* may also include a side wall portion (not shown) which extends toward the guide section 34 of the webbing guide 30. The extension 150*e* of the cover member 80*c* at least partially covers the guide section 34 of the webbing guide 30 to help prevent a portion of the vehicle occupant, such as the occupant's head, from directly contacting the guide section in the event of a collision.

In the seventh embodiment, shown in FIG. 16, the apparatus 10*f* includes a resilient cover member 80*f*. The face portion 82*f* of the cover member 80*f* includes a tab portion 240 which extends into the space 92*f* from the inner surface 86*f*. The tab portion 240 is circular and includes an annular groove 242. The tab portion 240 is snapped through the central opening 214 in the main portion 210 of the spring member 200 so that the main portion 210 of the spring member 200 seats in the annular groove 242 in the cover member 80*f*. The spring member 200 is inverted or turned 180° from its orientation in FIG. 11 and is attached directly to the cover member 80*f*.

In this embodiment, the web portion 224 of each arm 220 of the spring member 200 contacts the body section 32 of the webbing guide 30, and the main portion 210 of the spring member 200 extends beyond the head 76 of the mounting bolt 70 in the direction of the passenger compartment 13. The base portion 222 of each arm 220 contacts the inner surface 86*f* of the cover member 80*f* and slides radially outward along the surface 86*f* when the spring member 200 is compressed.

In the eighth embodiment, shown in FIG. 17, the apparatus 10*g* includes a spring member 200*g* having a main portion 210*g* which defines a central opening 214*g*. The central opening 214*g* has a diameter D5 which is larger than the diameter D1 of the bolt head 76. The main portion 210*g* of the spring member 200*g* is attached directly to the body section 32 of the webbing guide 30 by a suitable means, such as a weld 250. The main portion 210*g* of the spring member 200 does not contact the mounting bolt 70. In contrast to the embodiment of FIG. 16, the main portion 210*g* of the spring member 200*g* contacts the body section 34 of the webbing guide 30, and the web portion 224 of each arm 220 of the spring member 200 extends beyond the head 76 of the mounting bolt 70 in the direction of the passenger compartment 13.

From the above description of the invention, those skilled in the art will perceive improvements, changes, and modifications of the invention. For example, the mounting bolt 70 could be replaced by a stud/nut combination. Further, other types/configurations of spring members could be substituted for the spring members 100 and 200 disclosed herein. Such improvements, changes and modifications within the skill in the art are intended to be covered by the appended claims.

Having described the invention, I claim:

1. An apparatus for use in a vehicle having a passenger compartment, said apparatus comprising:

a webbing guide for guiding movement of seat belt webbing in the vehicle;

a mounting bolt for mounting said webbing guide, said mounting bolt having a bolt head for attaching said webbing guide in position in the vehicle; and a spring member held in position between said bolt head and a portion of said webbing guide, said spring member extending into the passenger compartment beyond said bolt head, said spring member being compressible in response to application of a force due to occupant movement in the passenger compartment.

2. The apparatus of claim 1 further including a resilient cover member secured to said webbing guide, said cover member covering said mounting bolt and defining a space between said mounting bolt and said cover member, said spring member being located in said space.

3. The apparatus of claim 2 wherein said cover member covers said webbing guide in addition to covering said mounting bolt.

4. The apparatus of claim 2 further including a load distribution member located between said spring member and said cover member.

5. The apparatus of claim 2 wherein said cover member deforms due to the applied force from an original condition to a deformed condition and said spring member compresses from an original condition to a compressed condition.

6. The apparatus of claim 5 wherein said cover member and said spring member return to approximately their respective original conditions when the force is removed.

7. A apparatus for use in a vehicle having a passenger compartment, said apparatus comprising:

a webbing guide for guide movement of a seat belt webbing in the vehicle;

a mounting bolt for mounting said webbing guide in position in the vehicle; and a spring member having a series of axially spaced coils including a mounting coil at a terminal end of said spring member, said mounting coil defining a mounting opening for receiving said mounting bolt therethrough, said spring member being compressible in response to application of a force due to occupant movement in the passenger compartment, said mounting bolt having a threaded portion and a head, said threaded portion projecting away from said head in a given direction, said axially spaced coils extending into the passenger compartment from said head in a direction opposite said given direction.

8. The apparatus of claim 7 wherein said spring member has a spring rate in the range of 200–500 lbs/inch.

9. The apparatus of claim 7 wherein said mounting coil of said spring member is attached to said webbing guide and a portion of said series of coils is disposed radially outward of and extends circumferentially around said mounting bolt.

10. An apparatus for use in a vehicle having a passenger compartment, said apparatus comprising:

a webbing guide for guiding movement of a seat belt webbing in the vehicle;

a mounting bolt for mounting said webbing guide in position in the vehicle; and a spring member having a series of axially spaced coils including a mounting coil at a terminal end of said spring member, said mounting coil defining a mounting opening for receiving said mounting bolt therethrough, said spring member being compressible in response to application of a force due to occupant movement in the passenger compartment;

said mounting bolt having a head having a first diameter, each one of said series of coils except said mounting coil defining an opening which has a second diameter larger than said first diameter.

11. The apparatus of claim 10 further including a resilient cover member secured to said webbing guide, said cover member covering said mounting bolt and defining a space between said mounting bolt and said cover member, said spring member being located in said space.

12. The apparatus of claim 11 further including a load distribution member located between said spring member and said cover member.

13. The apparatus of claim 11 wherein said cover member covers said webbing guide in addition to covering said mounting bolt.

14. The apparatus of claim 11 wherein said mounting coil of said spring member is attached to said cover member, a portion of said series of coils being disposed radially outward of and extending circumferentially around said mounting bolt.

15. An apparatus for use in a vehicle having a passenger compartment, said apparatus comprising:

a webbing guide for guiding movement of a seat belt webbing in the vehicle;

a mounting bolt for mounting said webbing guide in position in the vehicle; and a spring member having a series of axially spaced coils including a mounting coil at a terminal end of said spring member, said mounting coil defining a mounting opening for receiving said mounting bolt therethrough, said spring member being compressible in response to application of a force due to occupant movement in the passenger compartment;

said mounting bolt having a bolt head and said mounting coil being held in position between a portion of said webbing guide and said bolt head.

16. An apparatus for use in a vehicle having a passenger compartment, said apparatus comprising:

a webbing guide for guiding movement of a seat belt webbing in the vehicle;

a mounting bolt for mounting said webbing guide in position in the vehicle; and a spring member having a series of axially spaced coils including a mounting coil at a terminal end of said spring member, said mounting coil defining a mounting opening for receiving said mounting bolt therethrough, said spring member being compressible in response to application of a force due to occupant movement in the passenger compartment;

each coil in said series of coils except said mounting coil having an undulating configuration and alternating undulations on adjacent coils opposing each other to provide stiffness for said spring member.

* * * * *